Nov. 6, 1928.

W. W. OSBORNE 1,690,875

TRADE CHECK CREDIT MACHINE

Filed Aug. 4, 1922   6 Sheets-Sheet 1

INVENTOR
Wiley W. Osborne
BY James N. Ramsey
ATTORNEY

Nov. 6, 1928.

W. W. OSBORNE 1,690,875

TRADE CHECK CREDIT MACHINE

Filed Aug. 4, 1922   6 Sheets-Sheet 4

INVENTOR
Wiley W. Osborne
BY James N. Ramsay
ATTORNEY

Nov. 6, 1928.  1,690,875
W. W. OSBORNE
TRADE CHECK CREDIT MACHINE
Filed Aug. 4, 1922   6 Sheets-Sheet 5
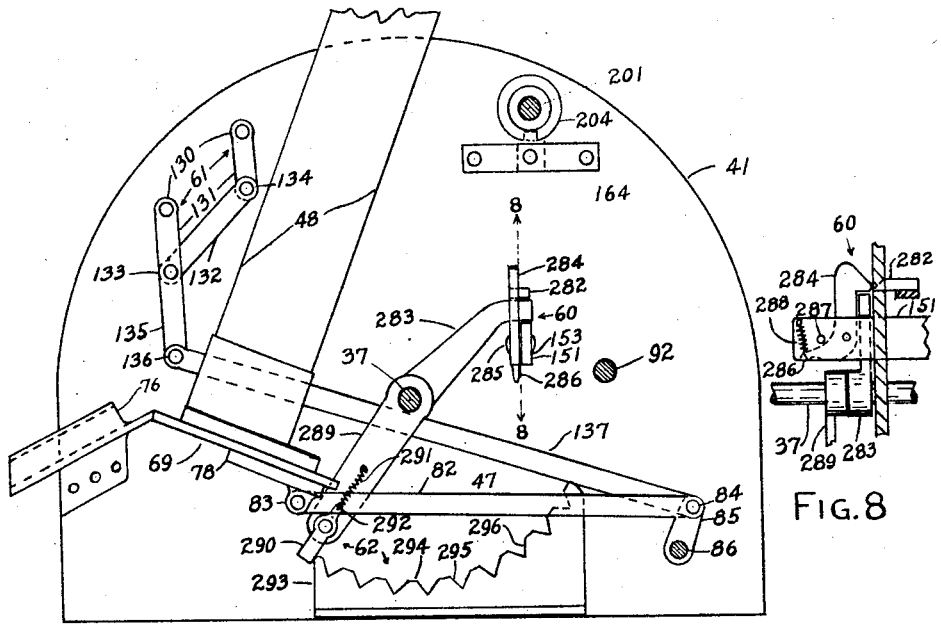
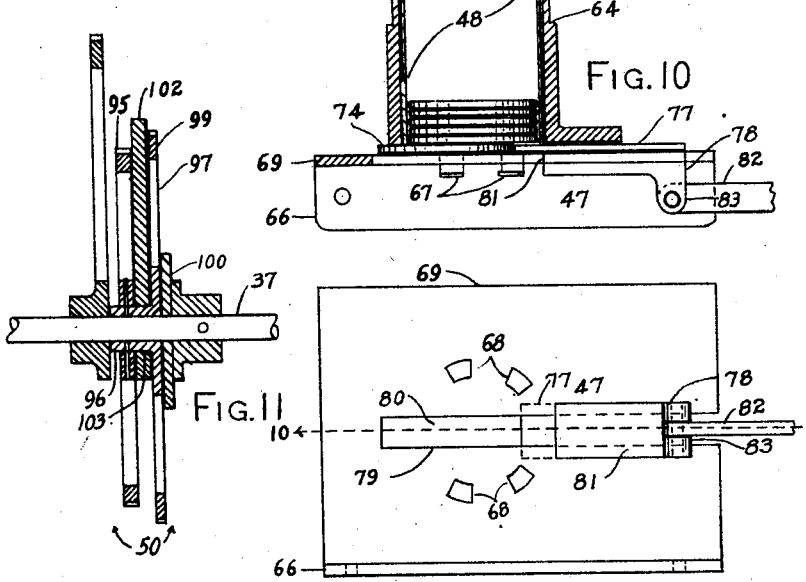
INVENTOR
Wiley W. Osborne
BY James N. Ramsey
ATTORNEY

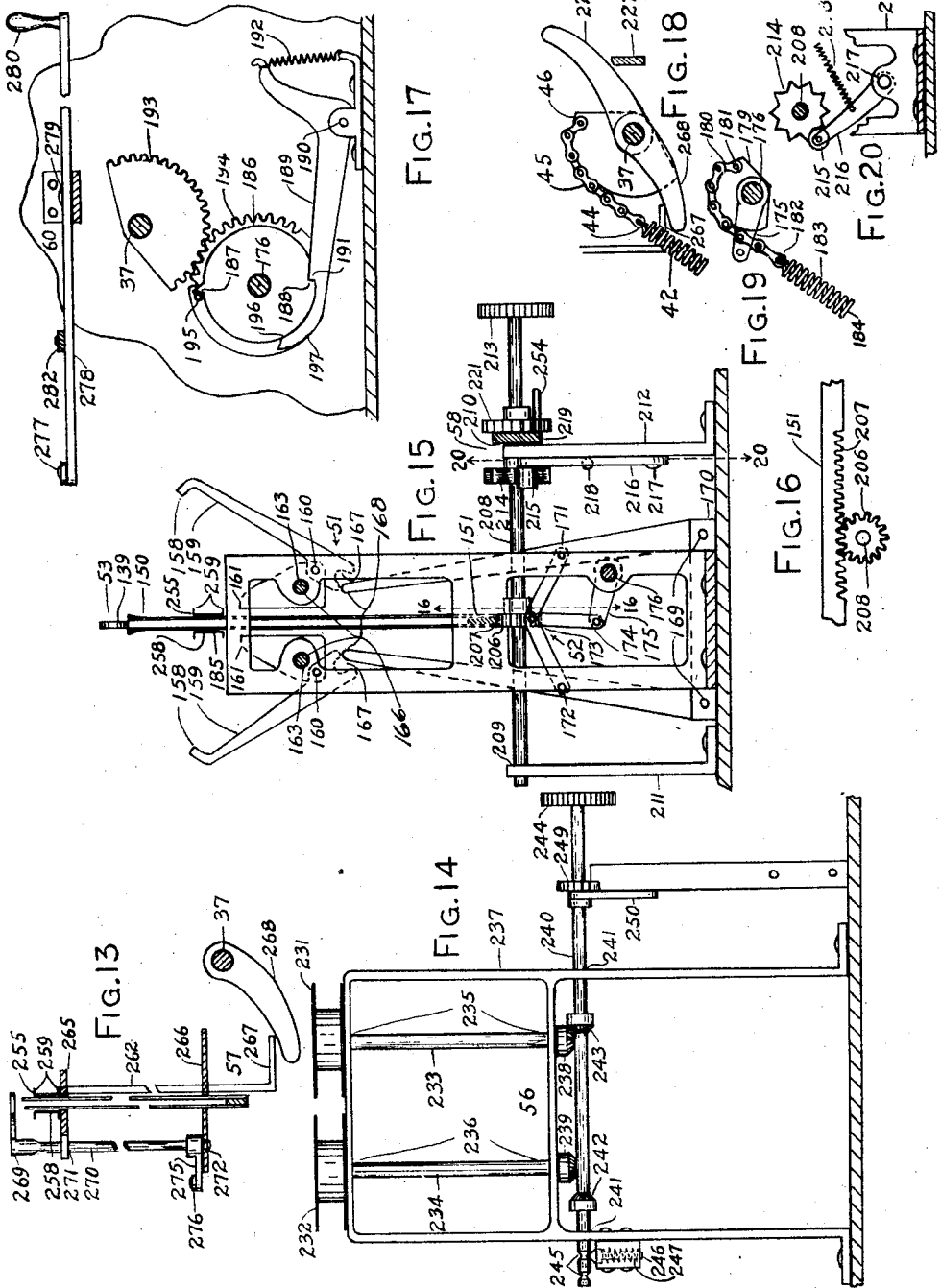

Patented Nov. 6, 1928.

1,690,875

UNITED STATES PATENT OFFICE.

WILEY W. OSBORNE, OF CINCINNATI, OHIO, ASSIGNOR TO THE OSBORNE CREDIT MACHINE COMPANY, OF CINCINNATI, OHIO, A CORPORATION OF OHIO.

TRADE-CHECK CREDIT MACHINE.

Application filed August 4, 1922. Serial No. 579,628.

My invention relates to trade-check credit machines, for use by concerns in communities where the trade-check credit system is or would be employed. This trade-check credit system is used extensively in coal, ore and other mine offices and commissaries, as well as lumber camps, oil fields and construction camp offices and commissaries. These camps and communities are usually isolated from other trade centers, which make the establishment of retail stores by the company interests necessary for supplying merchandise and other necessities of life to employees of such companies. It is customary in such communities to make the intervals of wage payment of longer duration than in the most closely populated centers, for the reason of inconvenient banking facilities and the necessity of carrying large sums of cash over long distances. These intervals of wage payment are usually either monthly or semi-monthly.

In the particular class of wage earners employed by business interests of the character stated in such camps and communities, there will be found many who administer their own personal financial affairs in such a way as to seldom have ready cash available for the purchase of such material and supplies necessary to their subsistence. It has, therefore, been the practice of such companies to make financial advances on workmen's earnings and yet avoid the necessity of handling cash in transactions of this nature. The employing or wage paying interest is hereinafter referred to as "the company" and the wage earner or employee is hereinafter referred to as "the workman".

The foregoing financial advances by the company to the workman are accomplished by the company issuing orders in various amounts to serve in lieu of cash in the purchase of merchandise at said company's store or commissary. Such orders are known to those familiar with this practice as "scrip" but will hereinafter be referred to as tokens or checks, whether in form of a written order, paper or card punch-out, coupons, metal checks or other medium of exchange or credit.

It will be observed that the foregoing system of credit or medium of exchange, is not only a convenience to the company and workman, but it extremely limits the possibility of theft, as these tokens are valueless outside of the community in which they are issued.

Many disputes have arisen in the past between the workman and the company issuing the tokens, owing to the miscalculation on the part of clerks and bookkeepers, or on the part of the workmen themselves, due more or less to the incomplete and arduous systems in general use. My invention contemplates a device involving in combination, an issuing, duplicate recording and registering machine adapted to issue with rapid accuracy single denomination coins or metal checks in various quantities, each check representing a certain unit of value which becomes a circulating medium between store and office, affording a complete checking system, instead of the paper scrip heretofore employed, and capable of recording on suitable duplicate record cards, such amounts as are issued, of protection for both workman and company, and further capable of carrying within the machine a daily and monthly total of the amounts of tokens issued for convenience of the issuing clerk and the auditor of his books.

My invention is also admirably adapted for use in retail stores and the like where credit is extended to its customers. A machine for similar use is disclosed in my application for United States Letters Patent Serial No. 395,220 filed July 10, 1920.

The object of my invention is to simplify and reduce to absolute accuracy the operation of the trade-check credit system; further, to provide indestructible tokens of exchange capable of reuse to replace the paper scrip; further, to avoid errors in calculating, issuing and recording amounts of credit issued; further, to automatically and simultaneously form duplicate copies of statements of accounts denoting the date and the amount of such credit issued, one of which is held by the company and the other by the workman, in evidence of the amount of credit drawn from time to time; further, to insure the duplex recording of such amounts simultaneously with the issuing of said credit; further, to reduce the number of denominations of checks or tokens heretofore employed to a single denomination and issue such single denomination of tokens in quantities corresponding to the amounts desired, by a single operation.

Another object of my invention is to provide a machine involving in combination, mechanism for carrying in coin or check form, single denominations of tokens, mechanism for discharging such tokens in such quantities corresponding to the values of credit desired to be issued, and simultaneously forming duplicate records of such transactions, with duplex registering mechanism, for carrying daily and monthly totals of credit issued, and operating mechanism for combinedly actuating said registering mechanism, record forming and token ejecting mechanisms.

My invention consists in the provision of a machine for simultaneously issuing various values in the form of metal checks, forming duplicate records of such transactions, and carrying daily and monthly totals of tokens issued; the foregoing being accomplished by a single operation.

My invention further consists in removable check carrying means for storing single denominations of credit in metal check form; further, in check ejecting mechanism for discharging checks from said check carrying means; further, in setting mechanism for controlling the number of checks discharged at a single operation of the machine and corresponding to the value desired to be issued; further, in novel record forming mechanism and devices for recording on separate duplicate record forms, the amounts with dates of issue of such credit denoted; the said record forming mechanism involving in its construction new character imprinting devices, for imprinting characters on record forms designating the values issued, novel record form carrying device for carrying the duplicate record forms and having embodied therein novel card elevating means for causing the record characters to be imprinted on the proper date line, combined hand and automatic inked ribbon feeding devices whereby the record characters are caused to be imprinted on the record forms by said imprinting mechanism and having actively associated therewith a novel ribbon guide facilitating duplex original copies being made simultaneously from one ribbon, an indicator on said guide showing space on record forms where printing will occur, ribbon manipulating means whereby the printed characters are made visible immediately following the imprinting action and without removing the record forms from the machine, novel combined hand and automatic traversing mechanism for said record form carrying device in order to present the record forms in the proper location to said character imprinting devices, and novel positioning mechanism for said character imprinting devices whereby the proper individual elements thereof are operatively connected to the actuating mechanism according to the position at which said setting mechanism is set and in such manner as to simultaneously record the exact amount of credit issued by said check ejecting mechanism.

My invention consists in the parts, construction, combination and arrangement of parts, and in the details of construction as is herein set forth and claimed.

In the drawings which show a preferred construction:

Fig. 8 is a vertical longitudinal section taken on the line 8—8 of Fig. 9 and showing a portion of the locking mechanism in rear elevation;

Fig. 9 is a vertical cross section taken on the line 9—9 of Fig. 5, illustrating the token ejecting, register actuating, locking and full stroke mechanisms;

Fig. 10 is a central vertical section of the token storing device and the check ejecting mechanism and taken in a plane corresponding to the line 10—10 of Fig. 12;

Fig. 11 is a detail in central vertical section taken on the lines 11—11 of Figs. 6 and 7;

Fig. 12 is a bottom view of the supporting plate for the token magazine and a portion of the token ejecting mechanism;

Fig. 13 is a fragmental vertical cross section taken from the left side of machine of the card carrier, ribbon manipulating device and so much of the locking mechanism as is closely associated therewith, and taken on the line 13—13 of Fig. 5;

Fig. 14 is a left side elevation of the inked ribbon feeding and controlling means;

Fig. 15 is a vertical cross section of the recording mechanism taken substantially on the lines 15—15 of Figs. 4 and 5;

Fig. 16 is a detail of the means for actuating the record form carrier taken on line 16—16 of Fig. 15;

Fig. 17 is a vertical section taken on the line 17—17 of Fig. 4 showing the means for actuating the trip shaft;

Fig. 18 is a vertical section taken on the line 18—18 of Fig. 5 showing the tension means for the main rock shaft, lifting finger for the ribbon manipulating device, the actuating arm for the automatic ribbon feed and spacing mechanism for the record form carrier;

Fig. 19 is a side elevation on the line 19—19 of Fig. 4 of the tension means for the trip shaft for actuating the imprinting mechanism;

Fig. 20 is a side elevation of the stop means forming part of the spacing mechanism for the record form carrier, taken substantially on lines 20—20 of Figs. 15 and 5.

Figure 1:
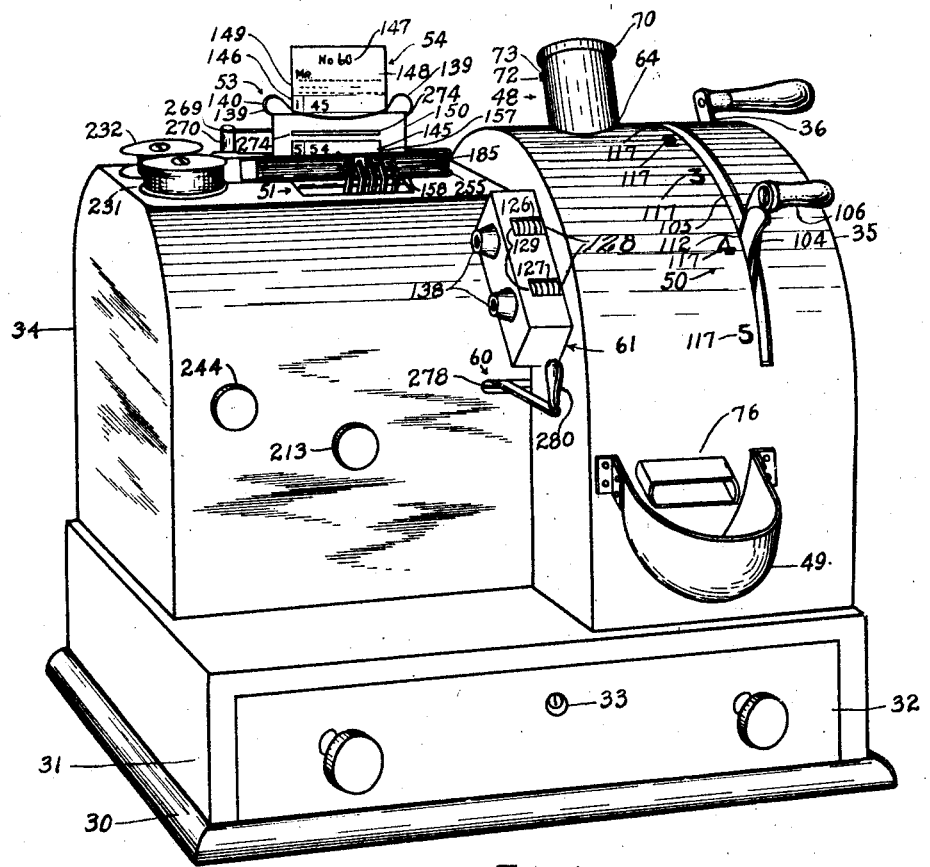
Fig. 1 is a perspective view of my novel machine.
Figure 2:
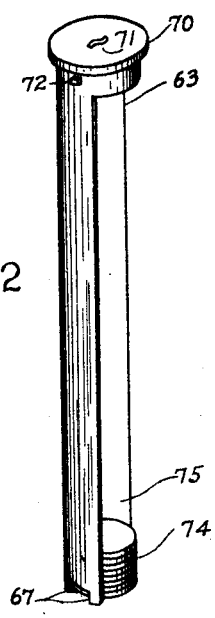
Fig. 2 is a perspective view of the removable token magazine.

My improved trade-check credit machine in its preferred form comprises a base 30 surmounted by a cabinet 31 containing a drawer 32 optionally held in locked position by a lock 33. A casing 34 and 35 secured to and above the cabinet incloses mechanism and devices which accomplish the objects herein stated.

In order to make more readily understood the construction and operation thereof, said mechanism and devices will be first described as in groups relating to the particular functions they perform, the several parts and construction of said groups being later described in detail.

The machine is actuated by a hand crank 36 fixed to the protruding end of a rockshaft 37 (Figs. 4 and 5) journaled in bearings 38 and 39, respectively, on upright frames 40 and 41.

The hand lever and rockshaft are normally held in retracted position by a relatively strong spring 42 (Figs. 4 and 18) having one end secured to the casing at 43 and its other end connected at 44 to a chain 45 received about a segment 46 fixed to the rockshaft. Actuation of rockshaft 37 sets in motion token ejecting mechanism 47 (Figs. 5 and 10) for discharging such a number of tokens as will correspond to the value of tokens desired to be issued from a removable token storing device 48 and into a delivery basin 49 secured to the exterior of the casing, the number of tokens ejected being predetermined by setting mechanism 50 closely associated with said ejecting mechanism.

Figure 3:
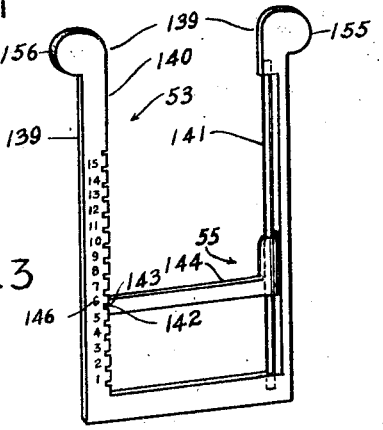
Fig. 3 is a perspective view of the adjustable record form carrier.

For simultaneously forming duplicate records of the aggregate values of tokens issued by the machine for each operation thereof, recording mechanism 51 (Figs. 1, 4, 5 and 15) also actuated by rockshaft 37, comprises a duplex character imprinting device 52, and a removable record form carrier 53 for carrying back to back the duplicate record receiving forms herein exemplified as consisting of duplicate record cards 54. Record form carrier 53 has embodied therein a card elevating device 55 (Fig. 3) for elevating the cards and thereby cause the imprinting of the record characters on the proper date line.

The recording mechanism further comprises a combined hand and automatic ink ribbon feeding device 56 (Figs. 4, 5 and 14) whereby the record characters are caused to be imprinted on record forms by imprinting device 52, and having actively associated therewith a ribbon actuating mechanism 57 in order to cause the record characters to become instantly visible following the imprinting action and without removing the cards from carrier 53.

Recording mechanism 51 also comprises combined hand and automatic traversing mechanism 58 (Figs. 5 and 15) for initially locating by hand, card carrier 53 with reference to record characters previously imprinted on the cards and in such manner as to expose the next available space for a succeeding record of a transaction, and afterward to automatically impart a step-by-step movement to the carrier should it become necessary to record a plurality of transactions immediately following each other on the same record cards.

In addition to the mechanism and devices previously enumerated recording mechanism 51 is provided with a positioning mechanism 59 for the duplex imprinting device controlled by setting mechanism 50 whereby the proper imprinting elements are selected in such manner as to cause the same to imprint a record character in accordance with the value issued, the card carrier being first manually located by the traversing mechanism 58. The exact value of tokens issued by the ejecting mechanism 47 is thus faithfully and simultaneously recorded on the cards.

In order to prevent the unintentional discharge of the checks or tokens, as by an accidental movement of the hand crank 36 and thus issue tokens without a record being made thereof and also to prevent the operation of the machine after the limit of the available recording space on the cards has been reached, locking mechanism 60 (Figs. 5 and 17) is so devised and embodied within the machine as to prevent operation of the various mechanisms by preventing actuation of the rockshaft 37. Accidental actuation of the hand crank in any manner is thus prevented, without record forms being in place or after a given date line has been filled.

To provide means of accurately determining the total amount of credit issued by the machine during given periods of time, herein instanced as by the day and by the month, a duplex registering device 61 (Figs. 1, 4 and 5) has mechanical connection with the token ejecting mechanism 47 in such manner as to cause simultaneous actuation thereof and thus provide an accurate means of checking the total disbursements against the amount of tokens on hand.

Rockshaft 37 has associated therewith a full stroke mechanism 62 (Fig. 9) serving to compel a complete stroke of the hand crank before a succeeding transaction can be made.

The token storing device 48 (Figs. 2, 4, 5, 10 and 12) is preferably so devised as to permit the same to be conveniently filled and then only by properly authorized persons. Thus 63 is a tubular check magazine removably carried in a fixed tube 64 secured to frame 41. The lower end of magazine 63 has integrally formed therewith inwardly projecting retaining fingers 67 which serve to retain the tokens within the magazine when removed from tube 64. Fingers 67 are received through apertures 68 in plate 69 of bracket 66, when in place in the machine, in which relation the tokens are supported on the plate.

To prevent the magazine being removed by unauthorized persons, the same is provided with a cap 70 fixed thereto and having a lock 71, the bolt 72 of which is adapted to enter slot 73 in fixed tube 64 when in locked relation. Tokens indicated at 74 are adapted to be placed in the magazine as through a side slot 75 therein extending in the direction of its length. Abutting the forward end of plate 69 is token chute 76 which passes through the wall of the casing and opens into delivery basin 49. Chute 76 is preferably placed at an angle to the horizontal (see Fig. 9) so as to assist the discharge of the tokens by the action of gravity.

The token ejecting mechanism 47 consists initially of a plunger 77 on reciprocating slide 78 carried by plate 69 directly below the token storing device. Guideways for the slide 78 are provided as by projecting walls 79 of a slot 80 received in grooves 81 of the slide. The slot is substantially smaller in width than the distance between retaining fingers 67 and is so located as to permit the slide to pass therebetween.

Movement is imparted to slide 78 as by a connecting rod 82 having one end pivoted thereto at 83 and having its other end pivoted at 84 (Fig. 5) to a crank 85 fixed on the end of rotatable shaft 86 carried in bearings 87 in upstanding supports 88 and side frame 40. Fixed on shaft 86 is a pinion 89 (Figs. 4 to 7) meshing with gear 90 on rotatable shaft 91 carried in bearings 92 and 93, respectively in frame 40 and one of the upstanding supports 88. Shaft 91 also has pinion 94 fixed thereon for combined movement with gear 90, and meshing with gear 95 fixed to hub 96 of ratchet wheel 97 journaled on rockshaft 37.

Movement is imparted to ratchet wheel 97 in such manner as to effect the discharge of a predetermined number of tokens by a single stroke of hand crank 36. This is accomplished by the setting mechanism 50, (Figs. 1 and 7) as by selectively limiting the duration of engagement of a pawl 98 with teeth 99 of the ratchet wheel 97. Pawl 98 is pivotally mounted on lever 100 fixed to rockshaft 37 and urged into engagement with the ratchet wheel by spring 101.

Setting mechanism 50 comprises cam segment 102 having a rockable bearing 103 about hub 96, between ratchet wheel 97 and gear 95. Segment 102 has lever 104 thereon projecting through slot 105 (Fig. 1) in the casing and having operating handle 106 secured to its outer end. Segment 102 further has formed thereon radial cam 107 adapted to coact with roller 108 on pawl 98 to lift the same out of engagement with the teeth of the ratchet wheel. In order to permit the continuation of movement of the pawl 98, and in consequence a full stroke of the hand crank, the segment is provided with an arc slot 109.

It will be observed that the extent of the movement imparted to the ratchet wheel by the pawl is dependent on the relative position of cam 107 and roller 108. It therefore follows that a given movement of the ratchet wheel will effect a given number of revolutions of shaft 86 through the medium of the speed-up train of gearing comprising gears 89, 90, 94 and 95, which in turn effects a given number of complete reciprocatory movements of slide 78, and in consequence the discharge of a given number of checks from magazine 63. Therefore, rockable lever 110 is pivoted at 111 to lever 104, and has finger contact end 112 projecting through slot 105 in the casing and located conveniently adjacent handle 106 so as to be readily manipulated. The other end of lever 110 has pawl end 113 thereon adapted to coact with teeth 114 (Fig. 6) of a stationary segmental ratchet 115 secured to the upper wall of cabinet 31. A spring 116 urges pawl end 113 into engagement with the stationary ratchet. Suitable numerical designations 117 are imprinted on the exterior of the casing and adjacent to slot 105 in order to visibly indicate the various positions of cam 107 and also the various values corresponding to the different quantities of tokens capable of being discharged by the ejecting mechanism.

Movement of the ratchet wheel in a reverse direction is prevented by pawl 118 pivoted at 119 to one of the supports 88, and urged into engagement therewith by spring 120.

In order to prevent movement of ratchet wheel 97 in excess of the proper amount and in accordance with the position of lever 104, a pawl 121 is pivoted at 122 to segment 102 and urged into engagement with the ratchet wheel by spring 123. The pawl 121 has pin 124 thereon adapted to coact with radial cam 125 fixed for combined movement with rockshaft 37 and so proportioned as to hold pawl 121 out of engagement with the ratchet wheel at the beginning of the stroke of the hand crank, and again permit the same to engage the ratchet wheel at the instant that cam 107 lifts pawl 98 out of engagement with said ratchet wheel.

The duplex registering device 61 consists of a plurality of counting units, each unit being employed for indicating total amounts of tokens issued over different periods of time, herein instanced as two periods, to wit: daily and semi-monthly. However, additional units may be employed, for example to indicate total amounts issued by the entire month or by the year. These counting units indicated at 126 and 127 show, respectively, daily and semi-monthly totals and may be of any usual construction devised for this purpose, wherein a series of numerical character designations 128 are displayed before windows 129. Counting units 126 and 127 are mounted on the exterior of casing 34 and have operating shafts 130 (Figs. 5 and 9) extending within the same. Arms 131 are fixed to the ends of these shafts and are connected by link 132 pivoted thereto at 133 and 134 for combined movement. One of arms 131 is extended as shown at 135 and has pivoted connection 136 with one end of connecting rod 137, the other end of which is pivotally connected to crank 85 by pivotal connection 84.

Locks 138 are provided on each of the counting units to enable only properly authorized persons to so manipulate their mechanisms as to set the same to zero at the ends of the stated periods.

The recording mechanism 51 has embodied therein a removable substantially U-shaped card carrier 139 (Fig. 3) comprising a vertical tang 140 and a vertical shaft 141 with a swinging cross member 144 floating thereon.

Cards elevating device 55 is formed as by providing the inner edge of tang 140 with notches 142, into which lug 143 of a swinging cross member 144 is adapted to be selectively received. The front and back surfaces of tang 140 have character designations inscribed thereon adjacent each of the notches 142 for the purpose of determining the proper position of the swinging cross member 144 so as to support the cards in such manner as to selectively present the proper one of the date lines 145 (Figs. 1 and 4) on cards 54. Cards 54 are usually renewed at the end of each month, or semi-monthly, and therefore have lines 145, each corresponding to a day in a given month. Numerical designations 146 are imprinted on the cards in juxtaposition with each date line in order to readily determine at a glance, the amounts of tokens issued on that date. At the tops of the cards a space 147 may be reserved for the workman's payroll number, an additional space 148 for his name, and such other information indicated at 149 as is necessary to the proper conduct of the business in which the machine is employed.

Card carrier 53 is removably held in receptacle 150 (Figs. 1, 4 and 5) the bottom wall of which is formed by slide bar 151 which is fixed therewith and mounted for endwise movement in bearings 152 and 153 respectively in side frame 41 and an upright 154. Card carrier 53 further has the ends 139 formed with outwardly flaring lips 155 and 156 to permit said carrier to be manually lifted therefrom for card elevational adjustment.

Card receptacle 150 has rectangular openings 157 therein through which recording device 51 operates to imprint characters by means of imprinting type 158 on type bars 159, so actuated as to strike the record cards placed in said receptacle. These type bars are pivoted at 160 in racks 161 with guide slots 162 therefor. The racks 161 are fixedly carried on slide members 163 of a positioning frame 164 (Fig. 5) and slidable endwise in bearings 165 and 166 (Fig. 4), respectively, in frame 41 and upright 154. Type bars 159 depend beyond their pivotal points to form forks 167 (Fig. 15) which are engaged by the upper ends of striker bars 168 pivoted at 169 to an angle strip 170 mounted in fixed position on the top of cabinet 31. There is a complete set of type bars together with a striker bar disposed on each side of the card carrier and receptacle, thus forming duplex imprinting device 51.

This duplex imprinting device is actuated as by pivotally connecting the outer ends of a pair of toggle levers 171 and 172 to striker bars 168 intermediate of their ends and their pivotal points 169, and having the inner ends of the toggle levers combinedly pivoted with one end of a link 173, the other end of which has pivotal connection 174 with arm 175 fixed on trip shaft 176 rockably mounted in bearings 177 and 178 (Fig. 4) respectively in frame 41 and upright 154. Striker bars 168 are normally held out of actual contact with the outer tangs of forks 167 through the medium of toggle levers 171 and 172, link 173 and arm 175 as by holding trip shaft 176 in normally retracted position under spring tension (Fig. 19). This is accomplished by fixedly mounting on said trip shaft segment 179 over which is received chain 180, one end of said chain being secured to the segment at 181 and its other end having connection at 182 with one end of spring 183, the other end of the latter being secured at 184 to a stationary part of the casing.

Spring 183 is capable of exerting a tension sufficient to retain the parts of the striker mechanism in retracted position but yet weak enough to be overcome by the relatively strong spring 42, the object of which is hereafter more fully explained.

Means are provided whereby an extremely rapid outward movement is imparted to striker bars 168 in mutually opposed directions, so as to in turn deliver a sharp blow to type bars 159, in order that the imprinting type thereof may forcibly press-ink ribbon 185 (Figs. 1 and 4) against the faces of the record cards (hereafter more particularly described) passing in front of the record cards on which the record characters are formed. Thus 186 (Figs. 4 and 17) is a circular trip plate fixed on trip shaft 176 having a radial lug 187 and a ratchet tooth 188 disposed diametrically opposite each other on its periphery. A bell crank lever 189 is pivoted at 190 to the top of the cabinet and has pawl 191 at its outer end adapted to cooperate with ratchet tooth 188 to hold trip shaft 176 stationary against the action of spring 183. A spring 192 urges pawl 191 into contact with trip plate 186. In order to permit spring 183 to compel sudden rocking movement of trip shaft 176 and nullify the superior force of spring 42, a gear segment 193 is fixed to rockshaft 37 and meshes with gear plate 194 journaled freely about the trip shaft closely adjacent trip plate 186. A pin 195 on gear plate 194 projects over the trip plate and is adapted to coact with cam surface 196 on extension 197 of bell-crank lever 189 located further outward than tooth 191. Pin 195 normally assumes a position against lug 187 by the retracting action of spring 42 through the medium of gear segment 193 and gear plate 194. When the rockshaft is actuated, however, pin 195 travels about the periphery of trip plate 186 until it contacts with cam surface 196 which impels bell-crank lever 189 outward withdrawing tooth 191 from behind ratchet tooth 188, thus effecting sudden rocking movement of the trip shaft by action of spring 183 to actuate the type bars. In consequence of this movement, trip plate 186 passes through a partial revolution and lug 187 is again in contact with pin 195. When rockshaft 37 is again returned to its former position, pin 195 causes trip plate 186 to return trip shaft 176 to assume its former position against the action of spring 183, the force of the latter being overcome by the force of spring 42. At the conclusion of the action just described tooth 191 again drops behind ratchet tooth 188 thereby retaining trip shaft 176 in readiness for a succeeding movement.

In order to present the proper type bars to the action of the striker bars in correlation with setting mechanism 50, positioning mechanism 59 (Figs. 4 and 6) is so devised as to cause movement of positioning frame 164, when lever 104 is moved to a position adjacent one of the numerical designations 117. Positioning mechanism 59 comprises a segment gear 198 freely journaled about rockshaft 37 and secured at 199 to segment 102 (Fig. 7) for combined movement therewith. Segment gear 198 meshes with pinion 200 on shaft 201 journaled in bearings 202 and 203 (Fig. 4) respectively in frames 40 and 41. Shaft 201 has fixed thereon a worm 204 which meshes with angular teeth of rack 205 (Fig. 5) on positioning frame 164. The parts just described are so proportioned as to cause positioning frame 164 to travel a distance equal to the distance from center to center of adjacent type bars when lever 104 is moved from one numerical designation 117 to an adjacent designation.

Combined hand and automatic traverse mechanism 58 (Figs. 5 and 15) is provided to enable the operator of the machine to initially locate the card carrier by hand, with reference to record characters previously imprinted on a given date line and in such manner as to present the next available space for recording a succeeding transaction, and afterwards to impart an automatic step-by-step movement to the card carrier when it becomes necessary to record a plurality of transactions immediately following each other.

In other words, when duplicate record cards are placed in the card receptacle and an entry has been made upon a given date line to record the amount of a transaction with the customer and the customer later returns and another transaction with the same party occurs upon the same date, the card holder is manually adjusted to position to permit the second transaction to be recorded immediately after the first, and so on, as each additional transaction occurs on the same date. The automatic operation of member 219 (lever) will automatically come into play to operate the printing mechanism during each operation of the machine by the common operating lever 36, which simultaneously ejects the tokens and registers the same.

Pinion 206 (Fig. 16) meshes with the teeth of rack 207 on slide bar 151. Pinion 206 is fixed on operating shaft 208 journaled in bearings 209 and 210, respectively, in standards 211 and 212 disposed to either side of the imprinting mechanism. A portion of shaft 208 projects through the casing and has knurled hand wheel 213 secured thereto. In order that the card carrier may be moved with relation to the space required by the record characters, a star wheel 214 (Figs. 15 and 20) is secured to shaft 208 and adapted to coact with roller 215 on lever 216 pivoted at 217 to standard 212. A spring 218 urges the lever 216 toward the star wheel 214 and causes roller 215 to enter the depressions therein so as to bring the card carrier to rest at predetermined points.

For automatically imparting a step-by-step movement to the card carrier rockable lever 219 (Figs. 4 and 5) is journaled about shaft 208 between the outside of standard 212 and ratchet wheel 221 fixed to said shaft 208. Rockable lever 219 is actuated as by forming the same of curved arms 222 and 223, the former being in contact with cam lever 224 (Figs. 4, 5 and 18) fixed to rockshaft 37. Arm 222 is normally held against pin 225 on standard 212 as by connecting one end of spring 226 to arm 223 and the other end thereof to standard 212. Shaft 208 is automatically actuated by pivotally mounting pawl 227 on arm 222 and adapting it to coact with ratchet wheel 221. Pawl 227 is provided with a tail, which is normally held in contact with pin 225 by spring 230.

It will be observed that when arm 222 is depressed by cam lever 224 against the action of spring 226, spring 230 will urge pawl 227 toward ratchet wheel 221 as pin 225 no longer holds said pawl 227 in retracted position. However, on the subsequent retracting movement of rock-shaft 37, spring 226 returns lever 219 to its former position, in the first part of which pawl 227 in turn imparts movement to ratchet wheel 221 and shaft 208. The final portion of the movement of lever 219 causes tail 229 to again contact with pin 225 and thereby disengage pawl 227 from ratchet wheel 221, leaving shaft 208 entirely free for manual operation.

Figure 4:
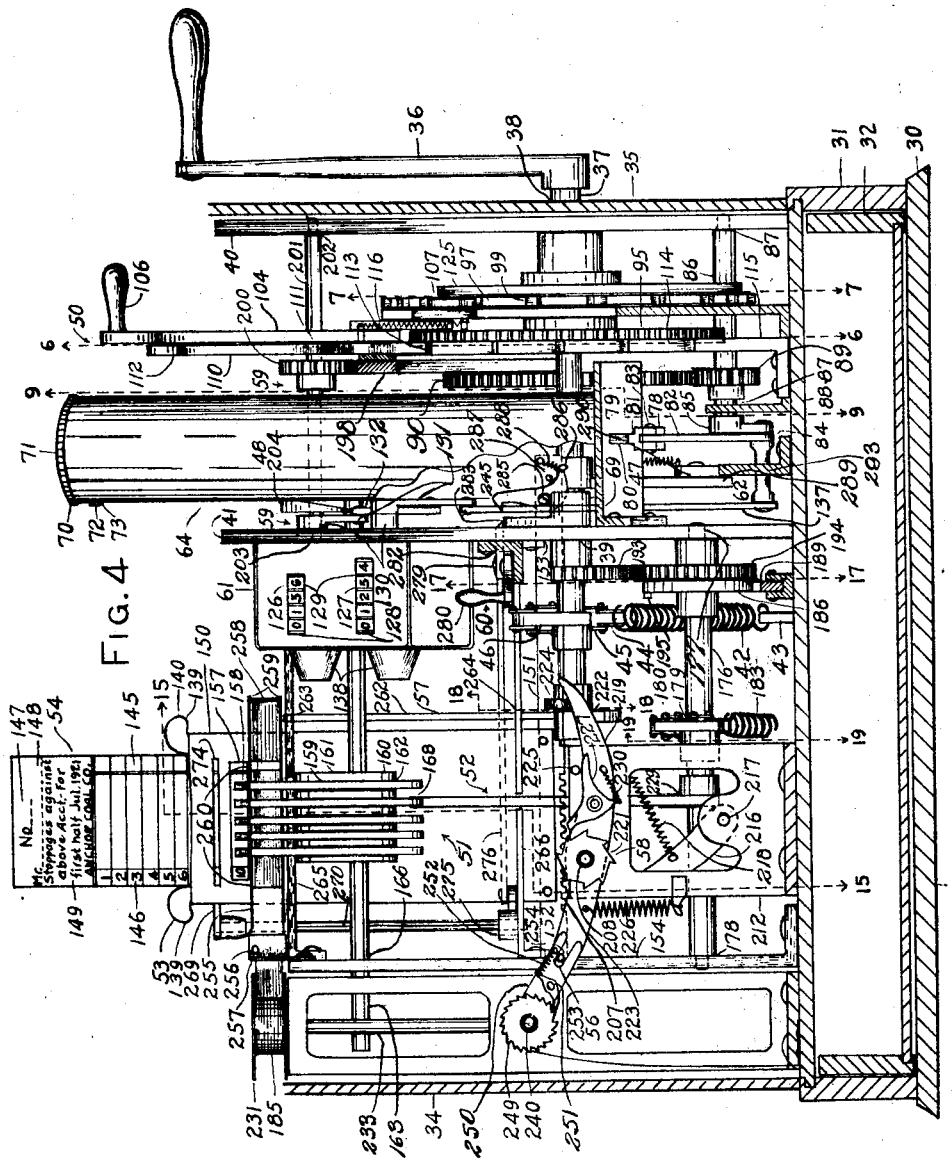
Fig. 4 is a front elevation of the mechanism comprising my improved machine.
Figure 5:
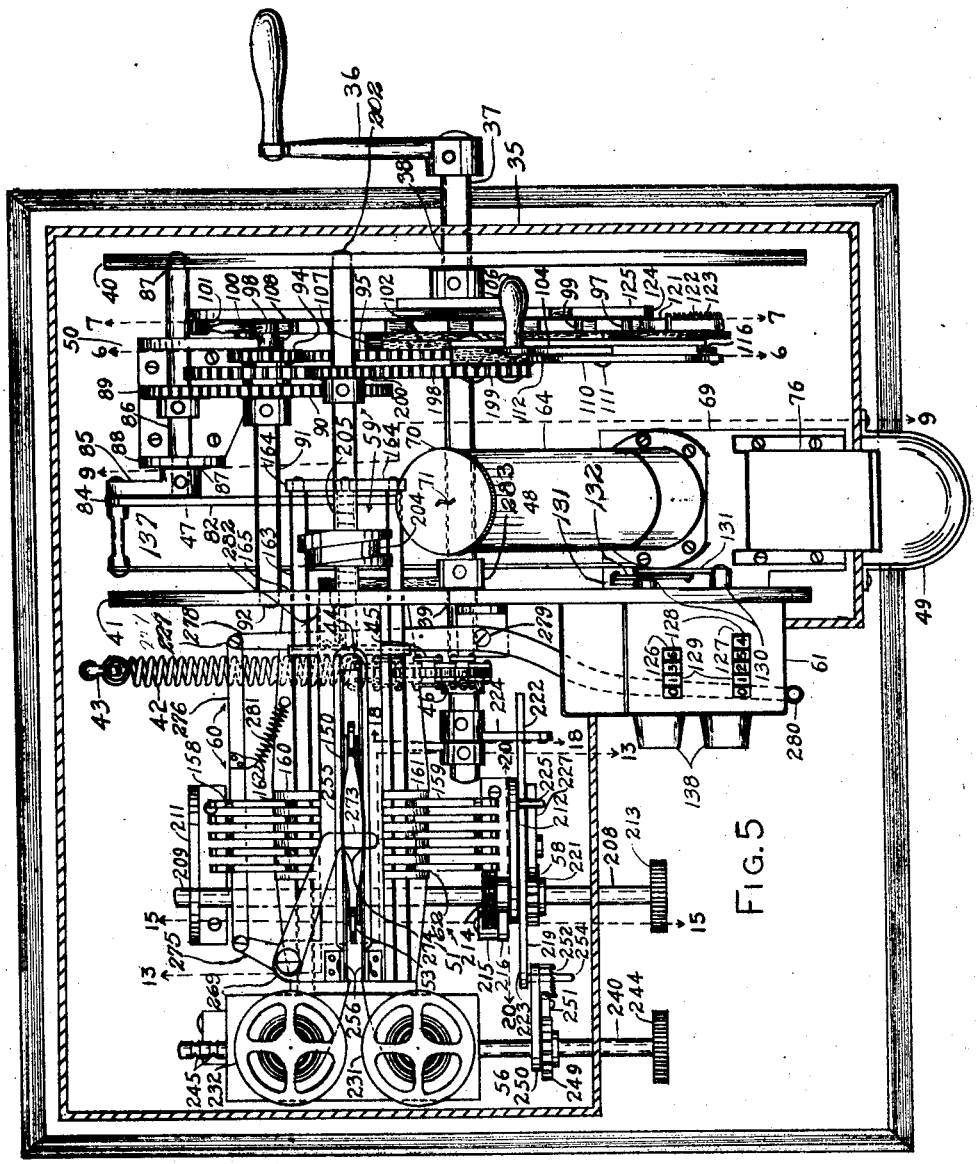
Fig. 5 is a plan view of my improved machine, the upper portion of the casing being shown broken away to expose the mechanism.
Figure 6:
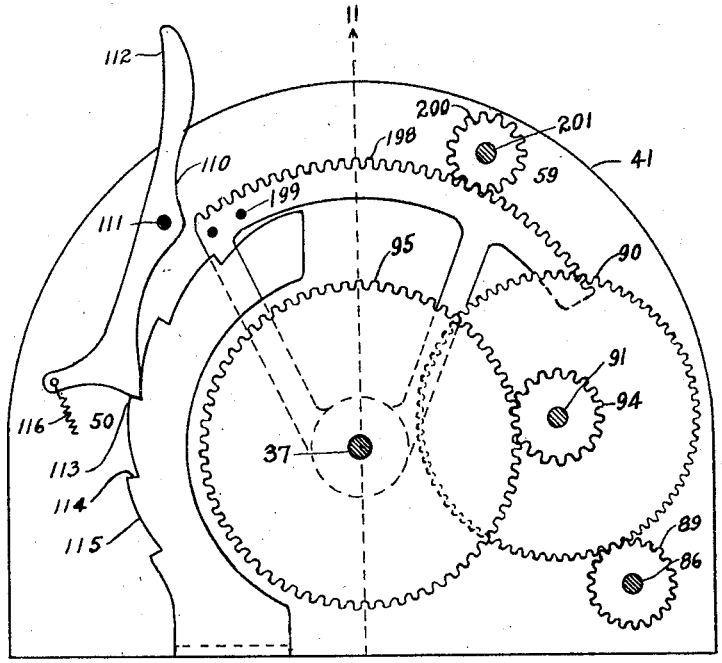
Fig. 6 is a vertical cross section taken on the line 6—6 of Fig. 4, showing the gearing for actuating the token ejecting mechanism, type positioning segment and setting rack.
Figure 7:
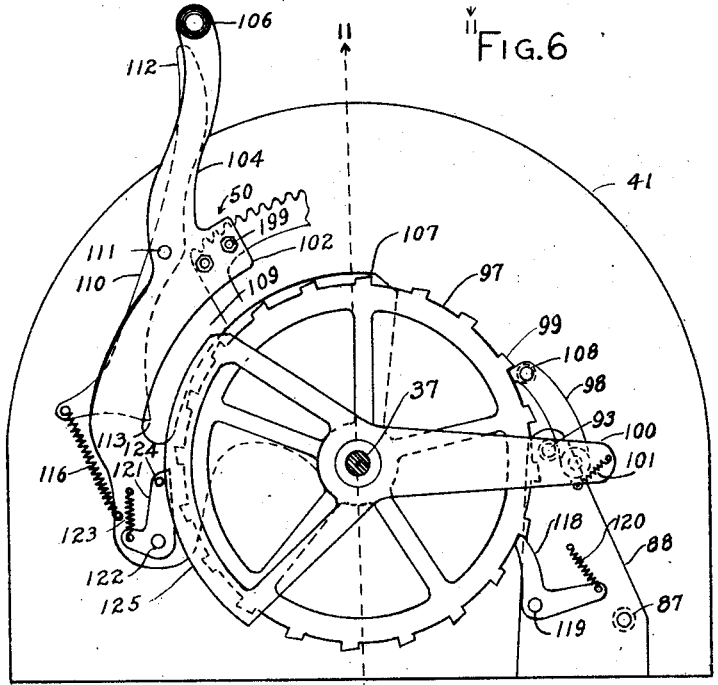
Fig. 7 is a similar view showing the setting mechanism and the operating and controlling means for the token ejecting and counting mechanisms taken on the line 7—7 of Fig. 5.

Ink ribbon 185 is carried in a step-by-step movement past the openings 157 in the receptacle 150 or card carrier 139 by ink ribbon feeding device 56 (Figs. 4, 5 and 14). This ink ribbon feeding device comprises spools 231 and 232 on which the ink ribbon is carried, the respective ends thereof being secured thereto. Means are provided to selectively wind up the ribbon on either one of the spools and draw the same from the other of the spools. Thus spool 231 is removably held on the upper end of vertical shaft 233 for combined rotation therewith and spool 232 is similarly held on the upper end of a shaft 234. Shafts 233 and 234 are journaled respectively in bearings 235 and 236 of frame 237 and have bevel gears 238 and 239 fixed on their lower ends. An endwise movable and rotatable horizontal shaft 240 journaled in bearings 241 of frame 237 has bevel gears 242 and 243 fixed thereon. The forward end of shaft 240 projects through the front wall of the casing and has an operating hand wheel 244 fixed thereto. Bevel gear 243 is so located as to be capable of being brought into mesh with bevel gear 238 by pressing shaft 240 inward and bevel gear 242 is so located as to be brought into mesh with bevel gear 239 when said shaft is pulled outward. It will be observed that rotary motion may thus be selectively imparted to either of spools 231 or 232.

To properly position shaft 240 so as to selectively hold either bevel gears 238 and 243 or bevel gears 239 and 242 in mesh, the rear end is provided with annular V shaped grooves 245 adapted to be engaged by plunger 246 carried in frame 237, spring 247 urging said plunger toward the shaft.

Rotary step-by-step movement is imparted to shaft 240 as by fixedly mounting ratchet wheel 249 thereon adjacent to which is rockably journaled lever arm 250 having pawl 251 pivoted thereto which engages said ratchet wheel. A spring 252 normally urges pawl 251 toward ratchet wheel 249. Lever arm 250 has a slot 253 therein which is engaged by a pin 254 on curved arm 223 of rockable lever 219.

Ribbon feeding device 56 has closely associated therewith ribbon actuating mechanism 57 (Figs. 4 and 13) for lifting the ink ribbon into position before openings 157 in receptacle 150 so as to be struck by type 158 of the imprinting mechanism, and afterwards to instantly cause the imprint made, to become immediately visible by causing the ink ribbon to assume a position below said openings 157. Thus the ribbon is guided and carried from spool 231 about receptacle 150 back to spool 232 or vice versa, by a U shaped channel member 255 pivoted at 256 to vertical brackets 257 secured to upright 154. Channel member 255 comprises a vertical wall 258 and horizontal flanges 259. Vertical wall 258 is provided with rectangular openings 260 before which the ribbon passes and which come temporarily to rest before openings 157 in receptacle 150, when channel member 255 is in raised position.

Means are provided to raise channel member 255 by swinging the same upwardly about its pivot 256, which means comprises a vertically movable push rod 262 carried in bearings 263 and 264, respectively, in an upper plate 265 and a lower plate 266, each of the latter being secured to upright 154 and frame 41. Upper plate 265 also provides a rest for channel member 255 when in lowered position. Push rod 262 is actuated as by having a foot 267 on the lower end thereof engaged by finger 268 fixed on rock-shaft 37.

Locking mechanism 60 is provided to prevent accidental actuation of any of the previously described mechanisms by the hand crank when no record cards are in place or after all of the available space on a given date line has been filled. This locking mechanism consists initially of an arm 269 (Figs. 1, 5 and 13) fixed on the upper end of a vertical rockshaft 270 carried in bearings 271 and 272 respectively on plates 265 and 266. The outer end of arm 269 has a bent finger 273 thereon adapted to pass freely through coincident slots 274 of receptacle 150 when cards are not in place, and adapted to be held in retracted position by the cards themselves when placed in the card carrier.

The lower end of shaft 270 has fixed thereto a second arm 275 to the outer end of which is pivoted one end of a connecting rod 276, the other end of the latter having pivotal connection 277 with the rear end of a rockable lever 278. Lever 278 is pivoted at 279 to a bracket on frame 41, the front end extending through the casing and having an operating handle 280 thereon. A spring 281 having one end connected to connecting rod 276, and the other end secured to a stationary part of the machine, urges finger 273 against the cards or through one of the slots 274.

A lug 282 located on lever 278 between its pivotal point and the rear end thereof extends through frame 41 and is adapted to be received immediately above an arm 283 (Figs. 4, 8 and 9) fixed to rockshaft 37, in such manner as to prevent forward movement of the hand crank when no record cards are in place in the card carrier.

That portion of the locking mechanism thus far described relates only to a means of preventing accidental actuation of the machine when the record cards are not inserted therein. Additional means are provided however to prevent actuation of the hand crank when the limit of space available on a given date line has been reached. Thus slide bar 151 is extended beyond bearing 153 and passes below the end portion of arm 283 and has a retaining hook 284 pivoted thereon at 285. Hook 284 is located to the outside of arm 283, and in such manner as to be received thereover only when receptacle 150 has traveled to the extreme left limit of its movement. Hook 284 and lug 282 are so arranged as to occupy the same position above arm 283. Means are, therefore, provided to enable hook 284 to give way to lug 282 should a condition arise making it necessary to remove the cards when the card carrier has reached the limit of its movement toward the left. Thus hook 284 has tail 286 thereon adapted to be held against stop pin 287 by spring 288. It will be observed that when lug 282 comes into contact with hook 284, the latter is readily forced out of the way, yet at the same time automatically assumes its former position when the lug is again withdrawn by manipulation of lever 278.

To insure complete performance of all of the functions of the previously described mechanism and devices full stroke mechanism 62 is so devised as to cooperate directly with rockshaft 37. This full stroke mechanism consists of arm 289 fixed to rockshaft 37, and has square end pawl 290 pivoted to its outer end. Pawl 290 is resiliently held in a position radial to shaft 37 by spring 291 having one end secured to arm 289 and the other end connected to tail 292 of the pawl. Pawl 290 coacts with two-direction ratchet plate 293 mounted on the top wall of the cabinet, and has teeth 294 therein, the latter being provided with forward stop faces 295 and rearward stop faces 296.

The machine is used in connection with a suitable card file which may be of ordinary construction for numerically or alphabetically filing the record cards in order that they may be readily accessible and easily located. We will assume that a workman makes request for an advance on his pay to the amount of seven dollars which will of course be issued to him in the form of tokens. The workman presents his record card, whereupon the clerk who may also be the operator of the machine selects the corresponding card from the company's file, and pulls handle 280 of locking mechanism 60 to the right and holds same in this position which action withdraws finger 273 from slots 274 in receptacle 150. Both cards are now inserted back to back in the card carrier 139 of the machine, following which handle 280 is released, finger 273 contacting with the cards and thereby holding the locking mechanism in inoperative position.

A function simultaneously occasioned by manipulation of handle 280 is the withdrawal of lug 282 from above arm 283 thereby preparing for free movement of rockshaft 37. As we will assume that the present date is the sixth of the month, cross member 144 has been previously so located as to have its lug 143 in notch 142 adjacent one of the designations 146, namely: Number 6.

The cards being supported on this cross member the date line corresponding to the sixth of the month is positioned before openings 157. This latter adjustment is usually made the first thing in the morning of the current day.

The operator next manipulates hand wheel 213 of traversing mechanism 58 so as to present the next available space on the date line toward the right on the cards to the action of duplex imprinting device 52 through the medium of pinion 206 in mesh with rack 207 of slide bar 151 which moves receptacle 150 to the right.

In order to include in the description of the operation all of the functions of the various mechanisms it is assumed that but two spaces on the sixth date line are still available for recording amounts issued.

The largest amount capable of being issued and recorded by the machine is five dollars, yet the amount requested is seven dollars. The operator, therefore, issues five dollars in a first transaction and follows the same by issuing two dollars in a second transaction, the procedure being as follows:

Lever 104 is moved by handle 106 to one of the designations 117, namely: 5, while simultaneously holding finger contact end 112 of lever 110 so as to lift pawl end 113 clear of ratchet 115. Upon the handle 106 and finger contact end 112 being released pawl end 113 drops back into engagement with ratchet 115, thereby holding the setting mechanism in position. Manipulation of handle 106 moves cam 107 to such a position as will compel token ejecting mechanism 47 to discharge the proper number of tokens.

Movement of lever 104 also actuates positioning mechanism 59, whereby the proper type bar is caused to assume a position preparatory to performing its imprinting function. The type 158 on the type bars 159 are consecutively formed of numbers denoting the aggregate values of the different quantities of checks capable of being issued, namely one, two, three, four and five dollars. Segment gear 198 being arranged for combined movement with lever 104 and in mesh with pinion 200, shaft 201 is rotated causing rotation of worm 204, which imparts endwise movement to positioning frame 164, carrying with it racks 161 and type bars 159. The parts of the positioning mechanism are so proportioned as to cause imprinting type "5" to assume a position formerly occupied by imprinting type "1", when lever 104 is moved from designation 1 to designation 5.

The machine is now in condition for issuing of the tokens and recording of the amount issued. Upon actuation of hand crank 36, movement is imparted to rockshaft 37, which carries with it lever 100 and pawl 98 in contact with ratchet wheel 97. Movement of pawl 98 will impart movement to ratchet wheel 97, to an extent in accordance with the position of cam 107 which, in this particular case, is through an arc including 5 teeth. Ratchet wheel 97 is brought to rest by cam 107 on pawl 98 whereby the same is disengaged from teeth 99.

The ratchet wheel 97 carries with it gear 95 which sets in motion the train of gearing consisting of pinion 94, gear 90 and pinion 89, which rotates shaft 86 one revolution for each tooth that said ratchet wheel is moved. For each revolution of shaft 86 a complete forward and back movement of slide 78 is caused by crank 85 and connecting rod 82. As pusher finger 77 is attached to slide 78 a token is ejected for each revolution of shaft 86, and discharged into delivery basin 49, which, in this particular instance, takes place five times, thus discharging tokens to the amount of five dollars.

Simultaneously with the discharge of the tokens, the duplex registering device 61 is actuated to indicate a daily and monthly total of the tokens issued. Rotation of crank 85 imparts rocking movement to arms 131 through the medium of connecting rod 137 which causes counting units 126 and 127 to display the totals for the respective periods for which they are intended. Unit 126 is set back at the end of each day, the result indicated thereby checked against the remaining amount of tokens on hand. Unit 127 is set back at the close of each half month, the result being similarly checked against the semi-monthly ledger balance.

In addition to operating check ejector mechanism 47, registering device 61, and positioning mechanism 59, rockshaft 37 simultaneously actuates the duplex imprinting device 51, by imparting abrupt rotary motion to trip shaft 176 through the medium of gear segment 193 and gear plate 194, cooperating by means of pin 195 with trip plate 186 and lever 189 to release the force stored up in spring 183 and thus suddenly rock said shaft. This motion of trip shaft 176 causes the particular pair of type bars to imprint their characters on the cards by means of ink ribbon 185, motion being transmitted thereto through the medium of striker bars 168, toggle levers 171, link 173 and arm 175 fixed to the trip shaft.

During the interval in which the various mechanisms already described are being actuated, movement of rockshaft 37 depresses cam lever 224 which in turn depresses arm 222 of rockable lever 219. This action withdraws tail 229 of pawl 227 away from pin 225 and thereby permits the said pawl to engage ratchet wheel 221. Arm 223 of lever 219 is thereby forced upward which in turn also forces arm 250 upward by means of pin 254 and slot 253. Upon the retracting movement of rockshaft 37 pawls 227 and 251 respectively cause limited rotary movement of ratchet wheels 221, and 249. Ratchet wheel 221 being fixed to shaft 208, receptacle 150 and card carrier 139 are moved to the left through the medium of pinion 206 meshing with rack 207 on slide bar 151. The record cards are thus placed in such a position as to present the succeeding space for recording an additional transaction, which in this particular instance concerns the amount of two dollars, the manner of handling which is later described.

As ratchet wheel 249 is fixed to shaft 240, ink ribbon 185 is also fed forward a small amount, through the medium of bevel gears 238 and 243 and vertical shaft 233 or bevel gears 239 and 242, and shaft 234 depending on which pair is set in mesh by the operator by means of hand wheel 244.

Another function occasioned by actuation of rock-shaft 37 is the raising of channel member 255 about its pivot 256 in order to position the ink ribbon 185 before the openings 157 in the receptacle, the parts being so arranged that this takes place previous to the release of trip shaft 176 for causing actuation of the type bars. The initial movement of rockshaft 37 raises finger 268, thereby in turn raising channel member 255, by means of push rod 262, the foot 267 of which is in contact with said finger 268.

Forward movement of the hand crank must be carried out completely before the same can be retracted by spring 42, as arm 289 of full stroke mechanism 62 is fixed to rockshaft 37. When arm 289 is carried in either direction by the rockshaft, square end pawl 290 will readily pass over teeth 294 of ratchet plate 293, as long as the movement is started at the end of the stroke and continued in one direction. Should, however, a movement be attempted in a reverse direction before the end of the ratchet plate is reached, the square end of pawl 290 will contact one of the stop faces 295 or 296 depending in which direction the movement is made. Therefore, a complete actuation of all mechanisms is assured.

After hand crank 36 is released, it together with rockshaft 37 is returned to the retracted position by means of the spring 42. The machine is now in condition for another transaction, the requirements in this particular instance being to issue an additional two dollars. Lever 104 is, therefore, placed adjacent Number 2, the parts of the setting mechanism assuming their position and performing their functions as previously described, after which the hand crank is pulled forward, causing the various mechanisms to pass through their cycle of movements.

It will be remembered that but one more space was available for recording a transaction on the record cards. This space is available to be filled by the record of the $2.00 issue of tokens. Also slide bar 151 and receptacle 150 has moved an additional space to the left. The locking mechanism is now automatically made operative by the hook 284, which has come to rest over the arm 283, as lug 282 is still away from said arm because the cards are still in the card carrier. It is now impossible to actuate the hand crank as rockshaft 37 is locked in position by arm 283 which is fixed thereto, being held under hook 284. However, when the cards are removed from the card carrier, finger 273 is permitted to pass through slots 274 thereby causing lug 282 on lever 278 to be positioned over arm 283, and forcing hook 284 out of the way. The machine is thus locked against unintentional operation and is again in condition for a succeeding transaction.

Having thus fully described my invention, what I claim as new and desire to secure by Letters Patent is:

1. In a trade check credit machine, trade check storing means for carrying a supply of trade checks representing like units of value, trade check ejecting mechanism capable of ejecting from said storing means one or more checks representing, respectively, one of said units of value or various multiples thereof, and comprising a rockable shaft, a ratchet wheel journaled freely thereon, a lever fixed to said shaft adjacent said ratchet wheel, a pawl pivotally mounted on said lever adapted for normal engagement with said ratchet wheel to rotate the latter to a varying degree, a rotatable shaft, a crank on said shaft, a slide operable below said storing means for ejecting checks therefrom, a mechanical connection between said slide and said crank, and gearing between said ratchet wheel and said rotatable shaft whereby varying degrees of rotation of said ratchet wheel causes one or more revolutions of said crank to eject one or more checks from said storing means.

2. In a trade check credit machine, trade check storing means, trade check ejecting means comprising a rockable shaft, a ratchet wheel journaled freely about said shaft, uniformly spaced teeth on said ratchet wheel, a lever fixed to said shaft, a pawl pivoted on the outer end of said lever adapted for normal engagement with said teeth, an adjustable cam mounted adjacent said ratchet wheel, but independently thereof, adapted to control engagement of said teeth by said pawl, a rotatable shaft, a crank thereon, a reciprocating ejector having mechanical connection with said crank and mounted below said storing means for ejecting checks therefrom one at a time, and gearing between said ratchet wheel and said rotatable shaft to cause one revolution of the latter for each angular distance between said teeth through which said ratchet wheel is actuated.

3. In a trade check credit machine, trade check storing means for carrying a supply of trade checks each representing a like unit of value, trade check issuing means comprising a rockable shaft having a forward and return movement, a ratchet wheel mounted for independent rotation on said rockable shaft, a lever fixed to said shaft carrying a pawl pivoted thereto for engagement with said ratchet wheel to actuate the latter in a forward direction, a second pawl to prevent return movement of said ratchet wheel, a rotatable shaft, a crank thereon, a slide mounted for reciprocation below said storing means operatively connected to said crank and adapted to eject one trade check for each revolution of said rotatable shaft, controlling means for said ejecting means comprising an adjustable cam adapted to control engagement of said first named pawl with said ratchet wheel to various desired degrees, a setting lever for adjusting said cam, indicating means adjacent said setting lever depicting said unit of value of said checks and various multiples thereof, a third pawl pivoted to said setting lever for engagement with said ratchet wheel, and a cam on said first named lever adapted to hold said last named pawl out of engagement with said ratchet wheel and permit momentary engagement therewith at the instant said first named pawl is disengaged, and gearing between said ratchet wheel and said rotatable shaft whereby varying degrees of rotation of said ratchet wheel causes a varying number of revolutions of said rotatable shaft to eject such a number of checks as correspond to the particular value of said indicating means to which said setting lever is adjusted.

4. In a trade check credit machine, check-storing means, a rockable shaft, a ratchet wheel journaled for rotation in one direction on said shaft, a lever fixed on said shaft, a pawl on said lever engaging said ratchet wheel and adapted to impart movement thereto on the forward movement of said shaft, controlling mechanism to control movement of said ratchet wheel to a varying degree by said pawl, mechanism operatively connected to said ratchet wheel to eject a varying number of checks from said storing means according to the degree of movement of said ratchet wheel, and operating means for actuating said mechanism.

5. In a trade check credit machine, a receptacle adapted to carry a record receiving element, a trade check storing means adapted to carry a supply of checks of similar units of value, trade check ejecting mechanism adapted to eject checks from said storing means in quantities of one or more to represent said unit of value or various multiples thereof, controlling mechanism capable of adjustment to various desired positions each position causing said ejecting mechanism to eject a different aggregate value of checks, a plurality of printing elements, each element having a printing face corresponding to the different aggregate values of checks capable of being ejected by said ejecting mechanism, and mechanism between said controlling means and said printing elements whereby the proper one of the latter is presented to said record receiving element when said controlling means is adjusted.

6. In a trade check credit machine, a receptacle adapted to receive a record receiving element, trade check storing means adapted to carry a supply of trade checks representing like units of value, a rockable shaft, trade check ejecting means operated by said shaft and capable of ejecting checks from said storing means in quantities of one or more to represent said unit of value or different multiples thereof, a controlling means capable of being adjusted to various desired positions corresponding to different values for causing said ejecting mechanism to eject a quantity of checks according to the position to which said controlling means is adjusted, a gear sector secured to said controlling means, a rotatable shaft, a pinion thereon engaging said gear sector, a plurality of printing elements each having an imprinting face corresponding to a different value of checks capable of being ejected at one operation of said ejecting mechanism, a frame movable endwise on which said printing elements are pivotally mounted, actuating mechanism whereby operation of said ejecting means causes operation of said imprinting elements, a worm on said rotatable shaft, and a rack on said frame meshing with said worm whereby movement of said controlling means to a desired position causes movement of said frame to cause the proper one of said printing elements to become operatively connected to said actuating mechanism.

7. In a trade-check credit machine, trade-check-storing means for carrying a supply of checks and having a discharge slot at the bottom thereof, check ejecting mechanism comprising a reciprocating slide, and adjustable means adapted to limit the number of reciprocations of said slide to the number of checks desired to be ejected.

8. In a trade-check credit machine, a card carrier, means for removably mounting said card carrier, said carrier being substantially U-shaped and provided with notches on its inner surface and the other arm having a vertical shaft mounted therein and partly spaced apart therefrom, and a card supporting cross member pivotally mounted on said shaft and having a projecting lug on its end adapted to engage any of said notches for the purpose of vertically adjusting the position of said card, substantially as specified.

WILEY W. OSBORNE.